United States Patent
Poczka et al.

(10) Patent No.: US 9,863,836 B2
(45) Date of Patent: Jan. 9, 2018

(54) MONITORING APPARATUS FOR A STEAM PLANT AND A METHOD OF OPERATING SUCH AN APPARATUS

(71) Applicant: Spirax-Sarco Limited, Cheltenham, Gloucestershire (GB)

(72) Inventors: Christopher Michael Roland Agard Poczka, Cheltenham (GB); Lyubka Spasova, Cheltenham (GB)

(73) Assignee: Spirax-Sarco Limited, Cheltenham, Gloucestershire (GB)

( * ) Notice: Subject to any disclaimer, the term of this patent is extended or adjusted under 35 U.S.C. 154(b) by 926 days.

(21) Appl. No.: 13/709,333

(22) Filed: Dec. 10, 2012

(65) Prior Publication Data
US 2013/0167783 A1 Jul. 4, 2013

(30) Foreign Application Priority Data

Dec. 30, 2011 (GB) .................... 1122459.9
Dec. 30, 2011 (GB) .................... 1122460.7
(Continued)

(51) Int. Cl.
*G01M 3/28* (2006.01)
*F22B 37/38* (2006.01)
(Continued)

(52) U.S. Cl.
CPC ............. *G01M 3/2807* (2013.01); *F16T 1/48* (2013.01); *F22B 37/38* (2013.01); *G01M 3/16* (2013.01); *G06F 17/00* (2013.01)

(58) Field of Classification Search
None
See application file for complete search history.

(56) References Cited

U.S. PATENT DOCUMENTS

| 2002/0124666 A1 | 9/2002 | Navarro et al. |
| 2006/0118648 A1 | 6/2006 | Armstrong et al. |
| 2011/0036424 A1* | 2/2011 | Oike ................... F16K 37/0075 137/551 |

FOREIGN PATENT DOCUMENTS

| GB | 2457923 A | 10/1987 |
| JP | 1992223223 | 8/1992 |
(Continued)

OTHER PUBLICATIONS

United Kingdom Intellectual Property Office Combined Search and Examination Report dated Jan. 23, 2012 in connection with Great Britain Application No. 1122462., 2 pages.
(Continued)

*Primary Examiner* — Paul West
*Assistant Examiner* — Mark A Shabman
(74) *Attorney, Agent, or Firm* — Gesmer Updegrove LLP

(57) ABSTRACT

The invention relates to a monitoring apparatus for a steam plant, the apparatus comprising: a sensor unit (110) associated with a component of the steam plant, the sensor unit (110) being configured to provide an output indicative of the operating condition of the component; wherein the sensor unit (110) has a plurality of operating modes, each operating mode having a different resource usage; the apparatus further comprising: a selector (130) for selecting one of the plurality of operating modes; wherein the operating mode is chosen based on a current operating condition of the steam plant. The invention also relates to a method of operating such an apparatus.

15 Claims, 13 Drawing Sheets

(30) Foreign Application Priority Data

Dec. 30, 2011 (GB) .................................. 1122461.5
Dec. 30, 2011 (GB) .................................. 1122462.3
Dec. 30, 2011 (GB) .................................. 1122463.1

(51) Int. Cl.

| | | |
|---|---|---|
| *G06F 17/00* | (2006.01) | |
| *G01M 3/16* | (2006.01) | |
| *F16T 1/48* | (2006.01) | |

(56) References Cited

FOREIGN PATENT DOCUMENTS

| | | |
|---|---|---|
| JP | H04-223223 A | 8/1992 |
| JP | H05-322603 A | 12/1993 |
| JP | 2003131735 A | 5/2003 |
| JP | 2005141439 A | 6/2005 |
| JP | 2008250431 A | 10/2008 |
| JP | 2009180648 A | 8/2009 |
| JP | 2011513687 A | 9/2009 |
| JP | 2010520705 A | 6/2010 |
| JP | 2011186646 A | 9/2011 |
| JP | 2011253491 A | 12/2011 |
| WO | 2009106851 A1 | 9/2009 |

OTHER PUBLICATIONS

Office Action issued by the Japanese Patent Office dated Dec. 11, 2015 in connection with Japanese Patent Application No. 2012-269385, 5 pages.

Office Action English Translation issued by the Japanese Patent Office dated Dec. 20, 2016 in related Patent Application No. 2012-269385.

English translation of the Office Action issued by the Japanese Patent Office dated May 31, 2016 in connection with related Japanese Patent Application No. 2012-269385, 3 pages.

\* cited by examiner

MONITORING APPARATUS FOR A STEAM PLANT AND A METHOD OF OPERATING SUCH AN APPARATUS

CROSS-REFERENCE TO RELATED APPLICATIONS

The present application claims priority to GB 1122463.1, GB 1122462.3, GB 1122461.5, GB 1122460.7 and GB 1122459.9 filed on 30 Dec. 2011, which are hereby incorporated by reference in their entirety for any and all purposes.

BACKGROUND

The invention relates to a monitoring apparatus for a steam plant and a method of operating such an apparatus.

It is known to provide a steam plant for generating and distributing useful energy, in the form of steam, to the point-of-use in various industrial applications.

Excessive condensate, accumulated as a result of utilising the steam's latent energy in a process, is typically undesirable since it may act as a barrier to heat transfer and can also lead to damaging "water-hammer" and can cause corrosion of the pipelines. It is therefore required to drain the condensate as soon as it is formed. The condensate is typically drained from the lowest points of the main plant pipeline through one or more drain lines. In order to limit steam loss from the plant, each drain line is provided with a respective steam trap, which ideally operates to drain condensate whilst at the same time preventing the escape of live steam.

Whilst the presence of condensate in the main plant pipeline is typically undesirable, the hot condensate will nevertheless contain useful energy. Therefore, in a typical steam plant the drain lines and steam traps will form part of a larger condensate recovery system designed to drain condensate (but not live steam) from the main plant and to recycle the drained condensate through a steam boiler for subsequent use in the plant. Thus, each drain line will typically feed into a condensate return line that in turn feeds one or more down-stream receiver tanks. The receiver tanks act as temporary storage units for drained condensate, which is then typically pumped from the receiver tank into the feed-tank of a steam boiler as required.

The efficient operation of a steam plant and condensate recovery system relies upon effective operation of the steam traps, and therefore the checking and maintenance of steam traps is very important. Conventionally, a detailed manual maintenance survey of steam traps will be carried out to identify faulty steam traps, possibly as part of a larger system audit. Current practice is to carry out such steam trap surveys periodically. However, a steam trap survey is normally a rigorous, tedious and often time-consuming process. Consequently, surveys are usually only carried out at periodic intervals of six to twelve months. Thus, in a worst case scenario it might be twelve months or more before a faulty steam trap is properly diagnosed in a maintenance survey. Given the large number of traps associated with a steam plant, significant numbers of traps could in principle become faulty in the intervening period between maintenance surveys.

WO 2009/106851 discloses a condensate recovery system which uses the correlation between steam levels and acoustic levels in the condensate return line to monitor the operation of the steam traps. The condensate recovery system comprises an acoustic sensor which provides an output indicative of the collective steam loss through the steam traps of the steam plant. The output therefore provides an indication of the condition and operation of the steam traps and enables faults to be identified.

The invention seeks to optimise such monitoring techniques to provide more efficient operation.

SUMMARY

The following presents a general summary of aspects of the invention in order to provide a basic understanding of the invention and various features of it. This summary is not intended to limit the scope of the invention in any way, but it simply provides a general overview and context for a more detailed description of various embodiments that follows.

In accordance with an aspect of the invention, there is provided a monitoring apparatus for a steam plant, the apparatus comprising: a receiver for receiving data from a sensor unit associated with a component of the steam plant, the sensor unit being configured to provide an output indicative of the operating condition of the component over a given period; a storage unit which stores the data received by the receiver; and a trend analysis unit, the trend analysis unit being configured to retrieve the data from the storing unit and to process and analyse the data to thereby identify a trend in the operation of the component.

The monitoring apparatus may further comprise a fault diagnosis unit which is configured to assess the trend identified by the trend analysis unit and to diagnose a fault experienced by the component.

The monitoring apparatus may further comprise a fault advisory unit which is configured to provide an advisory message with information on the type of fault, potential causes of the fault and/or how to rectify the fault.

The monitoring apparatus may further comprise a display unit. The display unit may display the data received from the sensor unit, the identified trend, the diagnosed fault and/or the advisory message.

The receiver may be a wired or wireless receiver. The monitoring apparatus may further comprise a transmitter (or transceiver) for two-way communication with the steam plant.

At least the trend analysis unit of the apparatus may be located remotely relative to the steam plant and/or component.

The apparatus may further comprise the sensor unit. The sensor unit and trend analysis unit may be located remotely from one another.

The trend may be time-based and/or may be linked to the operation of the steam plant. For example, the trend may relate to estimated steam loss, estimated condensate load and/or measured temperature. The trend may be a temporary or transient failure of the component which is experienced only under certain operating conditions of the steam plant. "Failure" may include inadequacies or limitations of the component. For example, the apparatus may identify where a steam trap in incorrectly sized.

The sensor unit may comprise a storage unit which temporarily stores the data before it is transmitted to the trend analysis unit. The sensor unit may comprise a vibro-acoustic sensor. The sensor may be mounted on a pipe adjacent the component. Further, the sensor may provide an output over a period of time of at least a day, week, month, or year.

The component may be a valve, such as a steam trap or other steam controlling component of a steam plant.

The apparatus may provide additional context to the measurements of the sensor (i.e. not simply "component is operating correctly or incorrectly") so as to allow a more accurate diagnosis to be made.

In accordance with another aspect of the invention there is provided a method of monitoring a steam plant, the method comprising: receiving data from a sensor unit associated with a component of the steam plant and being configured to provide an output indicative of the operating condition of the component over a period of time; and processing and analysing the data to identify a trend in the operating condition of the component.

The method may further comprise diagnosing a fault experienced by the component based on the identified trend.

The method may further comprise providing instructions on how to rectify the fault.

In accordance with another aspect of the invention there is provided a monitoring apparatus for a steam plant, the apparatus comprising: a sensor unit associated with a component of the steam plant, the sensor unit being configured to provide an output indicative of the operating condition of the component; wherein the sensor unit has a plurality of operating modes, each operating mode having a different resource usage; the apparatus further comprising: a selector for selecting one of the plurality of operating modes; wherein the operating mode is chosen based on a current operating condition of the steam plant.

The component of the steam plant may be a valve, such as a steam trap.

The sensor unit may utilise contextual information so as to allow it to operate in the most appropriate and efficient manner for the current operating condition of the steam plant. This may reduce the overall power consumption of the sensor unit. Where the sensor unit is battery-powered, this may reduce the frequency with which the batteries must be replaced or recharged. This may be particularly beneficial where the sensor unit is located in a relatively inaccessible location.

The operating condition of the steam plant may be sensed by the sensor unit.

The sensor unit may comprise a vibro-acoustic sensor.

The sensor unit may further comprise one or more additional sensors which may be configured to provide an output related to the operating condition of the steam plant.

The one or more additional sensors may comprise temperature and/or pressure sensors.

The one or more additional sensors may comprise a timer which is linked to an operating schedule of the steam plant.

The one or more additional sensors may comprise a light meter which is configured to detect the ambient light conditions.

The apparatus may further comprise an algorithm which is configured to recognise start-up and/or shutdown of the steam plant from the output of the sensor unit.

The selector may automatically select the operating mode. Alternatively, the selector may be manually controlled to select the operating mode.

The operating modes may have a different power usage or consumption, or complexity. The operating modes may have different requirements for storage and computational resources, such as time, memory, number of steps/iterations needed to provide a valid output, etc.

The operating modes may sample the output of a sensor of the sensor unit at different rates. The rates may depend on the type of component being monitored and the configured time for transmission or updates on the current operational conditions of the component.

The operating modes may process the output of a sensor of the sensor unit in different manners. As described above, the operating modes may have different requirements for storage and computational resources, such as time, memory, number of steps/iterations needed to provide a valid output, etc.

The apparatus may further comprise a wireless receiver and/or transmitter. The wireless receiver and/or transmitter may be activated in at least one of the plurality of operating modes and deactivated in at least one other of the plurality of operating modes.

The apparatus may comprise a plurality of sensor units and the selector of each of the plurality of sensor units may be controlled by the sensor unit itself, another of the sensor units or by a (central) monitoring unit.

The plurality of sensor units may be connected to one or more network nodes, the selectors of some or all of the sensor units in communication with an associated network node being controlled via said network node.

In accordance with another aspect of the invention there is provided a method of operating a monitoring apparatus for a steam plant, the apparatus comprising a sensor unit having a plurality of operating modes, each operating mode having a different resource usage, the method comprising: determining a current operating condition of the steam plant; and selecting one of the plurality of operating modes based on the current operating condition of the steam plant.

In accordance with another aspect of the invention there is provided a monitoring apparatus for a steam plant, the apparatus comprising: a vibro-acoustic sensor associated with the steam plant, the sensor being configured to provide an output related to the vibro-acoustic behaviour of at least a portion of the steam plant; a water hammer identification unit (which herein may be referred to in conjunction with an electronics unit) coupled to the sensor, the water hammer identification unit being configured to analyse the output of the sensor and to identify a signature of water hammer occurring in the steam plant.

The sensor may provide a continuous output which is analysed by the water hammer identification unit to identify the signature of water hammer.

The output of the sensor may be indicative of the operating condition of a component of the steam plant.

The component may be a valve, such as a steam trap.

The water hammer identification unit may be further configured to analyse the output of the sensor and to determine the operating condition of the component.

The water hammer identification unit may be configured to estimate the live steam leakage from the component.

The power required by the water hammer identification unit to analyse the output of the sensor and to identify the noise signature of water hammer may be less than the power required by the water hammer identification unit to analyse the output of the sensor and to determine the operating condition of the component.

The water hammer identification unit may analyse the output of the sensor to identify the signature of water hammer more frequently (or continuously) than the water hammer identification unit analyses the output of the sensor to determine the operating condition of the component.

The water hammer identification unit may identify the signature of water hammer directly from the output of the vibro-acoustic sensor.

The water hammer identification unit may identify the signature of water hammer when the output of the vibro-acoustic sensor exceeds a predetermined threshold.

When the water hammer identification unit identifies the signature of water hammer, the water hammer identification unit may further process and analyse the output of the sensor in order to confirm the presence of water hammer.

The water hammer identification unit may calculate a frequency spectrum of the output of the sensor and identify (or confirm) the signature of water hammer from the frequency spectrum. Alternatively, the water hammer identification unit may identify (or confirm) water hammer from characteristics of the signal in the time domain, frequency domain and/or time-frequency domain.

The monitoring apparatus may allow the occurrence of water hammer to be reliably detected. In particular, water hammer may be reliably detected by more frequently analysing the output of the sensor to identify unexpected and momentary water hammer events. The resources required to achieve such reliable detection may be reduced by optimising the processing and analysis carried out to identify water hammer. For example, the water hammer detection unit may detect water hammer from the raw data received from the sensor. This may be more efficient than analysing the frequency spectrum of the signal. However, when water hammer is suspected, the water hammer detection unit may carry out a more rigorous analysis to confirm the presence of water hammer. These measures may therefore reduce the power required by the monitoring apparatus.

The monitoring apparatus may also allow additional knowledge to be gained of how and when water hammer occurs in the steam plant. In particular, the relationship between the current operating condition of the component and the occurrence of water hammer may identify ways in which water hammer can be avoided.

The monitoring apparatus may further comprise an alerting means (such as an audible or visual alarm) which is triggered when the signature of water hammer is identified.

The monitoring apparatus may further comprise a controller which activates another component of the steam plant, such as a safety valve, when the signature of water hammer is identified. This may allow appropriate action to be taken before any damage is caused by water hammer.

In accordance with another aspect of the invention there is provided a method of monitoring a steam plant, the method comprising: acquiring a sensor signal related to the vibro-acoustic behaviour of at least a portion of the steam plant; and analysing the acquired sensor signal to identify a signature of water hammer occurring in the steam plant.

The method may further comprise analysing the acquired sensor signal to determine the operating condition of a component of the steam plant.

The acquired sensor signal may be analysed to estimate the live steam leakage from the component.

The power required for analysing the acquired sensor signal to identify the signature of water hammer may be less than the power required for analysing the acquired sensor signal to determine the operating condition of the component.

Analysing the acquired sensor signal to identify the signature of water hammer may be performed more frequently than analysing the acquired sensor signal to determine the operating condition of the component.

The signature of water hammer may be identified directly from the acquired sensor signal.

The signature of water hammer may be identified when the acquired sensor signal exceeds a predetermined threshold.

The method may further comprise, when the signature of water hammer is identified, further processing and analysing the acquired sensor signal in order to confirm the presence of water hammer.

The method may further comprise calculating a frequency spectrum of the acquired sensor signal and identifying (or confirming) the signature of water hammer from the frequency spectrum. Alternatively, water hammer may be identified (or confirmed) from characteristics of the signal in the time domain, frequency domain and/or time-frequency domain.

The method may further comprise providing an alert when the signature of water hammer is identified.

The method may further comprise activating a safety valve when the signature of water hammer is identified.

In accordance with another aspect of the invention there is provided a monitoring apparatus for a steam plant, the apparatus comprising: a vibro-acoustic sensor associated with a component of the steam plant, the sensor being configured to provide an output indicative of the operating condition of the component; and a condition monitoring unit (which herein may be referred to in conjunction with an electronics unit) coupled to the sensor; wherein the condition monitoring unit is configured to analyse the output of the sensor in order to identify characteristics attributed to live steam and characteristics attributed to condensate and to estimate steam leakage and condensate load for the component based on the identified characteristics.

The monitoring apparatus may allow additional information to be derived from the signal of the acoustic sensor. Further, knowledge of condensate load may provide valuable information about the operation and efficiency of the steam plant.

The condition monitoring unit may be configured to calculate a frequency spectrum of the output of the sensor.

The condition monitoring unit may be configured to divide the frequency spectrum into a plurality of frequency bands and to measure a peak magnitude within each frequency band.

The condition monitoring unit may be configured to calculate a ratio between the peak magnitudes of different frequency bands.

The condition monitoring unit may be configured to divide the frequency spectrum into a plurality of frequency bands to identify characteristics attributed to live steam and into a plurality of different frequency bands to identify characteristics attributed to condensate.

The condition monitoring unit may be configured to determine whether the estimated steam leakage and/or condensate load is below a predetermined lower threshold.

The condition monitoring unit may be configured to determine whether the estimated steam leakage and/or condensate load is above a predetermined upper threshold.

The apparatus may further comprise an alerting means (such as an audible or visual alarm) which may be triggered if the estimated steam leakage is above the predetermined upper threshold. The alerting means may alert an operative to replace the component or a part thereof either immediately or at a later time.

The condition monitoring unit may be configured to analyse the estimated steam leakage and/or condensate load over a period to identify trends.

The monitoring apparatus may further comprise a fault diagnosis unit which is configured to diagnose a fault with the component on the basis of the estimated steam leakage and/or condensate load.

The fault diagnosis unit may also analyse the time-based trends of the component operation identified by the condition monitoring unit.

The monitoring apparatus may further comprise an advisory unit which is configured to provide an advisory message with information on potential causes of the fault, the type of fault and/or how to rectify the fault.

The fault diagnosis unit may be configured to identify that the component is improperly sized when the estimated condensate load is above a predetermined upper threshold and/or below a predetermined lower threshold. For example, the fault diagnosis may identify that the component is improperly sized if the estimated condensate load is continuously or predominantly at a high or low level.

The component may be a steam trap (of any type or size) or any other type of valve.

In accordance with another aspect of the invention there is provided a method of monitoring a component of a steam plant, the method comprising: receiving an output from a vibro-acoustic sensor associated with the component of the steam plant, the sensor being configured to provide an output indicative of the operating condition of the component; analysing the output of the sensor in order to identify characteristics attributed to live steam and characteristics attributed to condensate; and estimating steam leakage and condensate load for the component based on the identified characteristics.

In accordance with another aspect of the invention there is provided a monitoring apparatus for a steam plant, the apparatus comprising: a non-contact vibro-acoustic sensor for remotely sensing the vibro-acoustic behaviour of a conduit of the steam plant, wherein the output of the sensor is indicative of the operating condition of a component of the steam plant in fluid communication with the conduit; and a condition monitoring unit (which herein may be referred to in conjunction with an electronics unit) coupled to the sensor for processing the output of the sensor and determining the operating condition of the component.

Using a non-contact sensor allows the monitoring apparatus to be located remotely with respect to the conduit and the component being monitored. Consequently, the sensor does not need to withstand high temperatures. It may therefore not be necessary for the sensor to be heat-shielded. Further, the other components of the monitoring apparatus, such as the condition monitoring unit, may be co-located with the sensor since they also do not need to withstand high temperatures.

The non-contact vibro-acoustic sensor may be an active sensor.

The non-contact vibro-acoustic sensor may be a laser Doppler vibrometer, an ultrasound Doppler vibrometer, a laser interferometer, a capacitive sensor, an inductive sensor, a fibre optic sensor, a surface acoustic wave sensor and/or an eddy current sensor.

The monitoring apparatus may further comprise one or more non-contact temperature sensors. The one or more non-contact temperature sensors may measure the temperature of the conduit. The non-contact temperature sensors may determine when the plant is in operation in order to trigger the operation of the vibro-acoustic sensor.

The non-contact temperature sensors may be infrared thermometers. The vibro-acoustic sensor may indicate a target of the infrared thermometer. For example, the vibro-acoustic sensor may comprise a laser (for example, where a laser vibrometer is used) which indicates the target of the infrared thermometer. This may ensure that the infrared thermometer is measuring the temperature of the conduit and not of the surrounding building, for example. Further, this functionality is provided without any additional components.

The component may be a steam trap.

In accordance with another aspect of the invention there is provided a method of monitoring a steam plant, the method comprising: providing a non-contact vibro-acoustic sensor; positioning the non-contact sensor away from a conduit of the steam plant; remotely sensing the vibro-acoustic behaviour of the conduit using the non-contact sensor, wherein the output of the sensor is indicative of the operating condition of a component of the steam plant in fluid communication with the conduit; and processing the output of the sensor to thereby determine the operating condition of the component.

The non-contact vibro-acoustic sensor may be an active sensor.

The non-contact vibro-acoustic sensor may be a laser Doppler vibrometer, an ultrasound Doppler vibrometer, a laser interferometer, a capacitive sensor, an inductive sensor, a fibre optic sensor, a surface acoustic wave sensor and/or an eddy current sensor.

The method may further comprise measuring the temperature of the conduit using one or more non-contact temperature sensors.

The non-contact temperature sensors may be infrared thermometers.

The method may further comprise indicating a target of the infrared thermometer using the non-contact vibro-acoustic sensor. For example, the vibro-acoustic sensor may comprise a laser (for example, where a laser vibrometer is used) which indicates the target of the infrared thermometer.

BRIEF DESCRIPTION OF THE DRAWINGS

For a better understanding of the invention and to show more clearly how it may be carried into effect, reference will now be made, by way of example, to the accompanying drawings in which.

DETAILED DESCRIPTION

Figure 1:
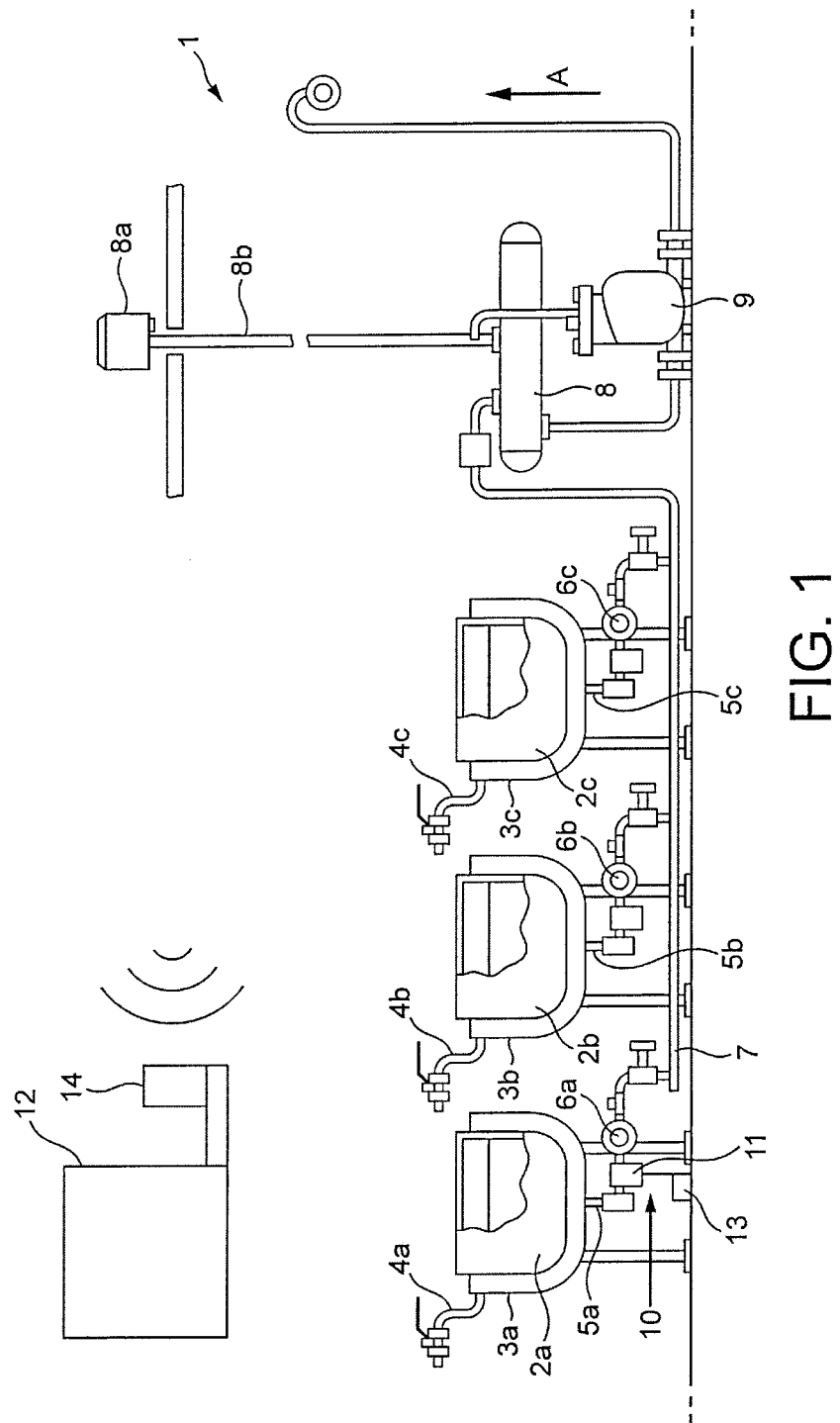
FIG. 1 is a schematic view of a condensate recovery system for an associated steam plant.

Referring to FIG. 1, an industrial unit is schematically shown, comprising steam utilizing equipment represented by three process vessels 2a, 2b, 2c having heating jackets 3a, 3b, 3c which are supplied with steam through inlets 4a, 4b, 4c. A condensate recovery system 1 comprises a plurality of drain lines, in this case three drain lines 5a, 5b, 5c, for draining condensate from the associated heating jacket 3a, 3b, 3c. The drain lines 5a, 5b, 5c each run between the respective heating jacket 3a, 3b, 3c and a common condensate return line 7 that feeds into a downstream receiver tank 8. Thus, during operation of the process vessels 2a, 2b, 2c, condensate will drain through the drain lines 5a, 5b, 5c, into the common condensate return line 7 and on to the receiver tank 8. The condensate may be stored temporarily in the receiver tank 8 before being raised to a condensate return main (not shown) by a pump 9, and subsequently fed into the feed tank of a steam boiler (not shown) for subsequent recycling (as steam) through the plant.

In order to limit the loss of live steam from the plant as the condensate is drained through the drain lines 5a, 5b, 5c, each of the drain lines 5a, 5b, 5c incorporates a respective steam trap 6a, 6b, 6c. The steam traps 6a, 6b, 6c could be any suitable steam trap, selected in accordance with system conditions and desired trap characteristics.

Ideally, the steam traps 6a, 6b and 6c will act to trap steam, so that live steam from the plant cannot escape into the condensate recovery line 7 and the condensate recovery line 7 and receiver tank 8 will contain only hot condensate. However, if one or more of the steam traps 6a, 6b, 6c develops a leak or fails 'open', steam will enter the condensate recovery line 7 and the receiver tank 8. This steam must be vented from the receiver tank 8 and the receiver tank 8 is thus provided with a conventional vent 8a at the end of an exhaust pipe 8b for this purpose. It will be appreciated that steam vented through the vent 8a escapes the steam/condensate loop altogether and the energy contained in this steam is therefore 'lost'.

It has been found that, for a typical condensate recovery system, there is a correlation between the levels of live steam leakage from a steam trap and the vibro-acoustic behaviour at the inlet of the steam trap.

Accordingly, a sensor unit 10 having a vibro-acoustic sensor 11 is positioned at the inlet of each of the steam traps 6a, 6b, 6c (although only the sensor unit 10 associated with the steam trap 6a is shown) to record the vibro-acoustic behaviour of the adjacent conduit. Specifically, each vibro-acoustic sensor 11 is clamped onto the drain line 5a, 5b, 5c at or near the inlet of the steam traps 6a, 6b, 6c.

The sensor unit 10 may comprise any suitable vibro-acoustic sensor, such as a piezo-electric sensor. The vibro-acoustic sensor 11 may detect vibrations and/or acoustic emissions from the adjacent conduit or component. In other words, the vibro-acoustic sensor 11 may be an acoustic and/or vibration sensor.

Where, as in the case of the vibro-acoustic sensor 11 of the sensor unit 10, the sensor is permanently clamped in position, it is envisaged that the associated relatively high operating temperatures (which may be as high as 425° C.) may require the sensor 11 to be heat-shielded as appropriate.

Alternatively, where the vibro-acoustic sensor 11 is being used to acquire data only intermittently, the entire sensor unit 10 or the vibro-acoustic sensor 11 alone may be moved into and out of position as and when required, so as not to exceed the thermal rating of the vibro-acoustic sensor 11 for any significant period of time.

Data acquisition from the vibro-acoustic sensor 11 may be enabled using a conventional or custom designed data acquisition system (DAQ). The DAQ may acquire data only when the output of the vibro-acoustic sensor 11 exceeds a predetermined threshold.

A temperature sensor (not shown) may also be provided in order to determine when the plant is in operation and to trigger the data acquisition system to capture the signal from the vibro-acoustic sensor 11. For example, the temperature sensor may be a resistance thermal detector (RTD).

Figure 2:
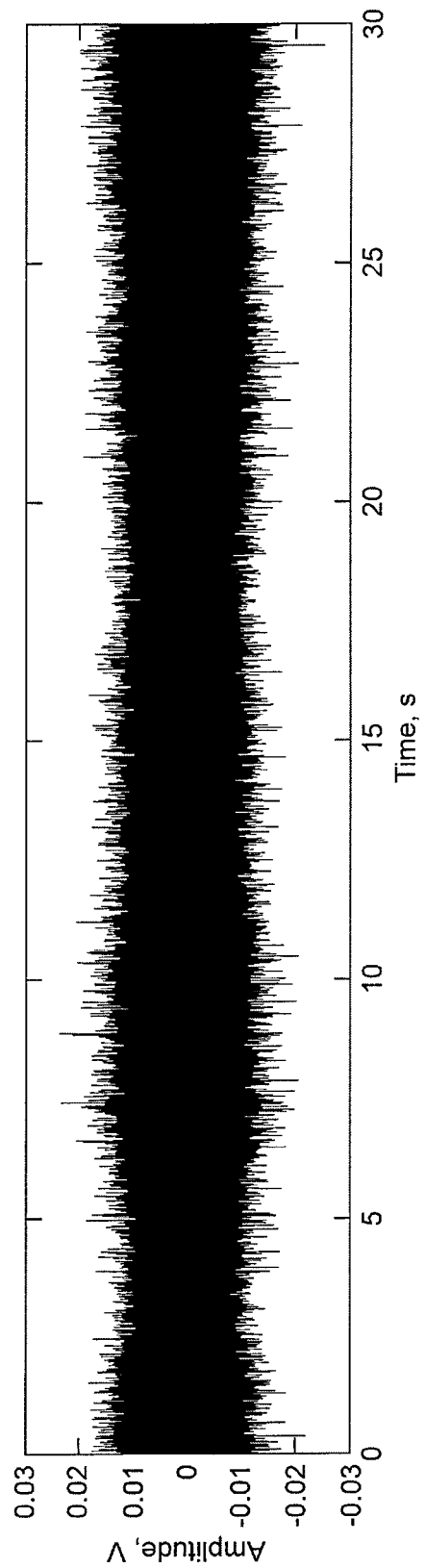
FIG. 2 is a graphical representation of a signal from a vibro-acoustic sensor positioned at the inlet of a steam trap experiencing a relatively high level of live steam leakage.

FIG. 2 shows an example of the raw vibro-acoustic data captured by the vibro-acoustic sensor 11 at the inlet of the steam trap 6a at a time when the steam trap 6a is experiencing a relatively high level of live steam leakage.

Figure 3:
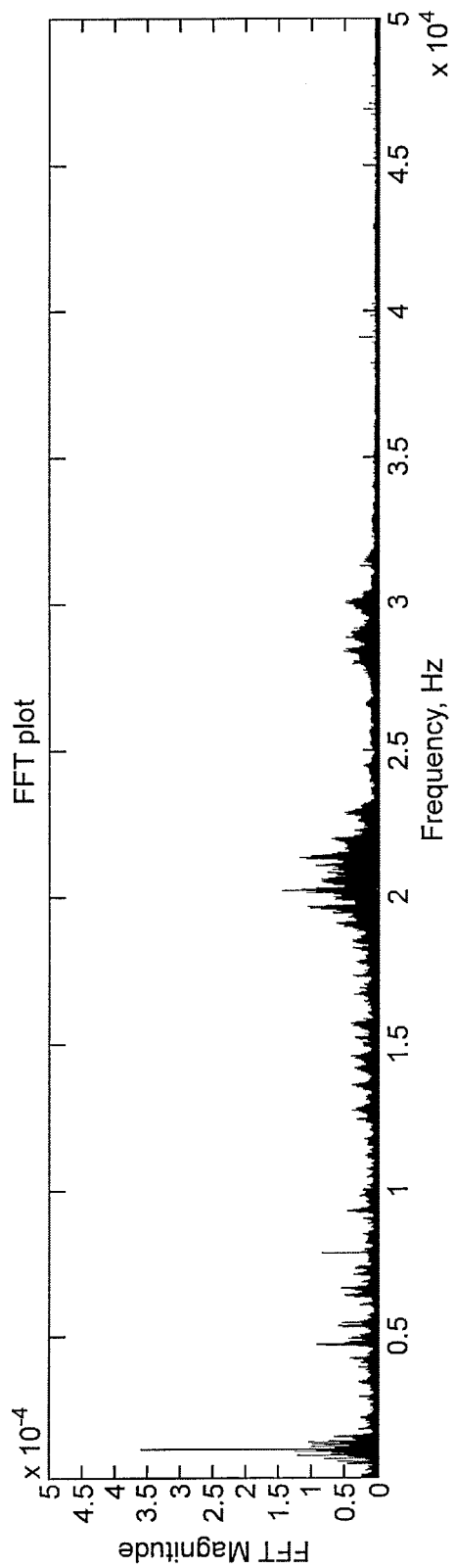
FIG. 3 is a graphical representation of a frequency spectrum derived from the signal shown in FIG. 2.

FIG. 3 shows a frequency spectrum of the raw vibro-acoustic data shown in FIG. 2.

Figure 4:
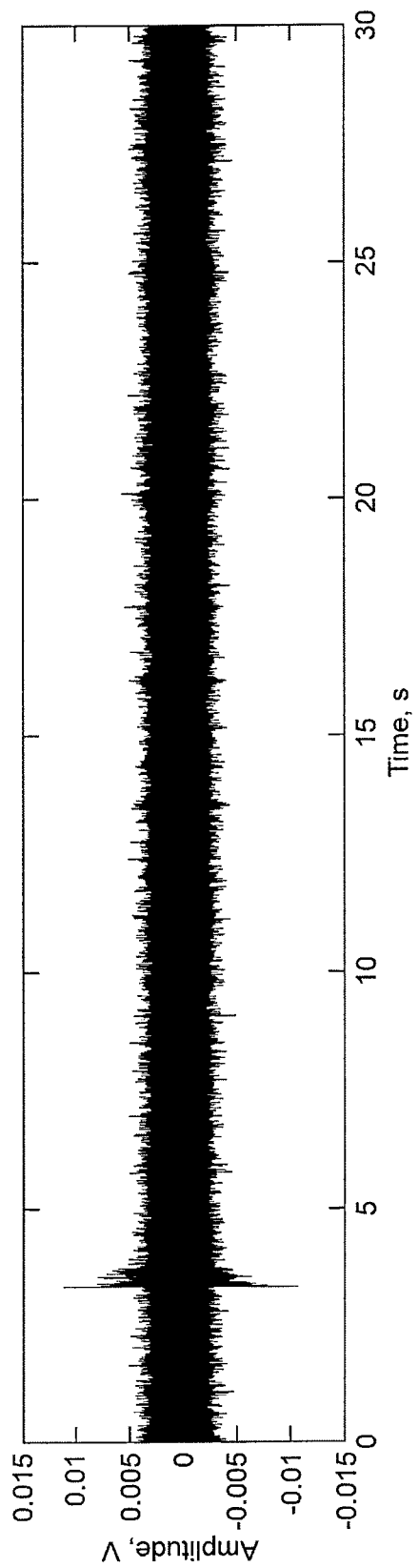
FIG. 4 is a graphical representation of a signal from a vibro-acoustic sensor positioned at the inlet of a steam trap experiencing a relatively low level of live steam leakage.

FIG. 4 shows an example of the raw vibro-acoustic data captured by the vibro-acoustic sensor 11 at the inlet of the steam trap 6a at a time when the steam trap 6a is experiencing a relatively low level of live steam leakage.

Figure 5:
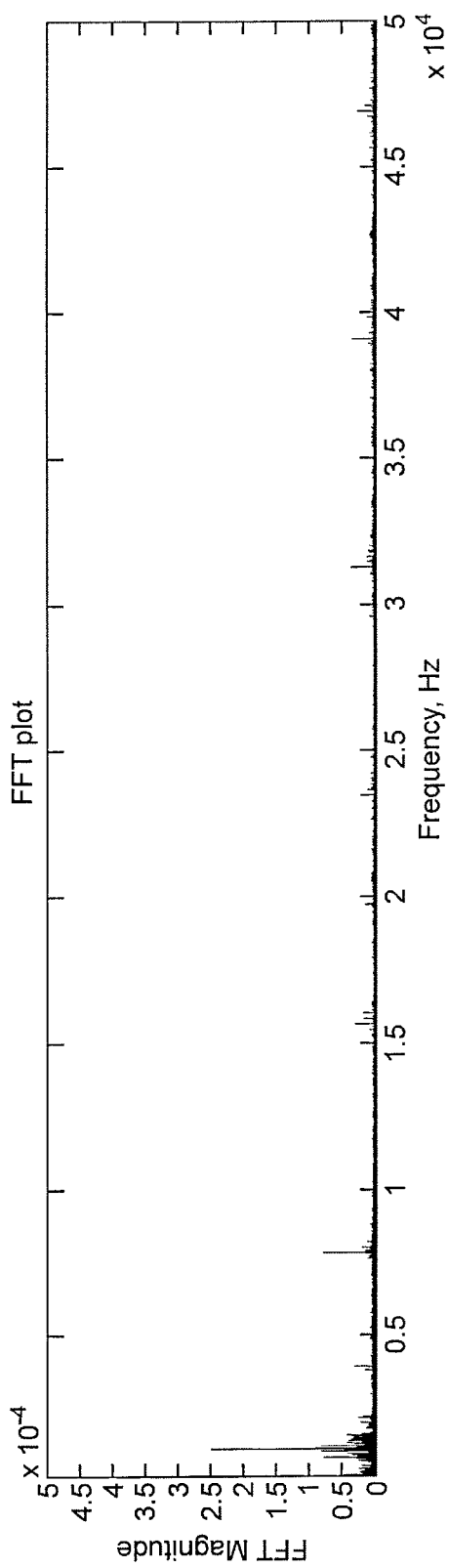
FIG. 5 is a graphical representation of a frequency spectrum derived from the signal shown in FIG. 4.

FIG. 5 shows a frequency spectrum of the raw vibro-acoustic data shown in FIG. 4.

In each case, the frequency spectrum is calculated using a 3.7 million floating point Fast Fourier Transform (FFT) algorithm. However, alternative methods may be used to calculate the frequency spectrum. For example, a lower resolution FFT or a fixed point FFT may be used to calculate the frequency spectrum of the acquired sensor signals.

As shown in FIGS. 3 and 5, there are significant differences between the spectrum associated with high levels of steam leakage and the spectrum associated with low levels of steam leakage which correspond to the different levels of live steam leakage from the trap.

Given the differences in the sensor signals of FIGS. 2 and 4 and the associated frequency spectrum shown in FIGS. 3 and 5, one or more parameters of the sensor output signal can effectively be used as a "metric" indicative of the level of live steam leakage. For example, the magnitudes of peaks in the spectrum differ in relation to the level of steam leakage. Ratios of certain peaks (such as the highest peak in a given frequency range) may be calculated for each spectrum and these ratios may correspond to the level of live steam leakage from the trap. Therefore, it is possible to monitor the live steam leakage from the steam trap 6a by monitoring and analysing the output of the sensor on the basis of a pre-determined relationship between the sensor signal frequency characteristics and the live steam leakage.

The invention utilises the signal provided by the vibro-acoustic sensor 11 of the sensor unit 10 to enhance the information obtained.

Accordingly, the sensor unit 10 forms part of a monitoring apparatus. Referring again to FIG. 1, the monitoring apparatus further comprises a monitoring unit 12, which will be described in detail below. The monitoring unit 12 is located remotely with respect to the sensor unit 10.

The sensor unit 10 comprises an electronics unit 13 (functioning as a condition monitoring unit) which is coupled to the vibro-acoustic sensor 11 and receives signals produced by the vibro-acoustic sensor 11. The electronics unit 13 processes and analyses the signal of the vibro-acoustic sensor 11 to determine the level of live steam leakage from the associated steam trap 6a (as described previously). The sensor unit 10 may therefore determine the operational condition of the steam trap 6a.

Accordingly, the electronics unit 13 comprises signal processing electronics, such as a Digital Signal Processor, which are pre-programmed with algorithms to process data. The electronics unit 13 may further comprise a signal conditioner such as a filter to remove extraneous noise from the acquired signal and/or an amplifier.

The electronics unit 13 further comprises a transmitter which receives the information on the operational condition of the steam trap 6a determined by the electronics unit 13 and transmits this information wirelessly. The electronics unit 13 may also transmit information on the current power status of the sensor unit 10. The monitoring unit 12 is provided with a complementary receiver 14 for receiving the signals transmitted by the transmitter of the electronics unit 13. For example, the electronics unit 13 and monitoring unit 12 may communicate via a Zigbee, Wi-Fi or Bluetooth connection or via any other suitable communication protocol.

The sensor unit 10 and monitoring unit 12 may be in continuous communication or may be only temporarily connected to allow data to be downloaded from the sensor unit 10 to the monitoring unit 12. Further, whilst the sensor unit 10 and monitoring unit 12 may be in continuous communication, the sensor 11 may only generate an output intermittently, as described previously.

Figure 6:
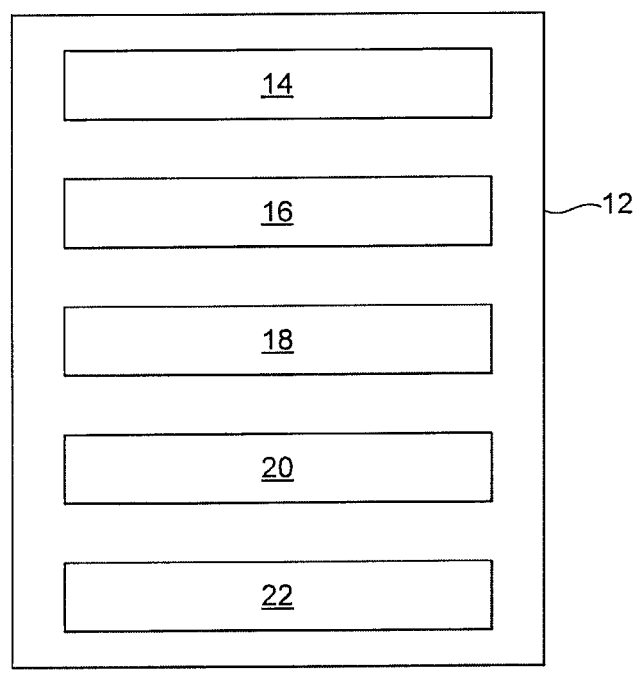
FIG. 6 is a schematic view of an embodiment of a monitoring unit of a monitoring apparatus in accordance with an aspect of the invention.

The component parts of the monitoring unit 12 are schematically shown in FIG. 6.

As described previously, the monitoring unit 12 is provided with a receiver 14 which receives the information transmitted by the transmitter of the electronics unit 13.

The receiver 14 is coupled to a storage unit 16, such as a conventional hard disk drive or other non-volatile or volatile memory-based storage medium. The sensor unit 10 may also be provided with such a storage unit in order to store data from the sensor 11 and electronics unit 13 before it is transmitted to the monitoring unit 12, particularly where the sensor unit 10 and monitoring apparatus 12 are only temporarily connected.

In turn, the storage unit 16 is coupled to a trend analysis unit 18. The trend analysis unit 18 executes algorithms which process the information received from the electronics unit 13 of the sensor unit 10 and identifies trends in the information.

The outputs of the algorithms performed in the trend analysis unit 18 are input to a fault diagnosis and advisory unit 20 which will be described in more detail below.

The monitoring unit 12 further comprises a display unit 22. The display unit 22 is ultimately used to display results, such as information or instructions, from the fault diagnosis and advisory unit 20 to a human operative. The display unit 22 may also display elements prior to the output of the fault diagnosis and advisory unit 20. For example, the display unit 22 may display information received by the receiver 14, the output of the trend analysis unit 18, etc.

The sensor unit 10 may also be provided with a display unit which may form part of the electronics unit 13. The display unit may display any information acquired or determined by the sensor unit 10. For example, the display unit may display the raw signal acquired by the sensor 11, the frequency spectrum obtained from the signal, information (such as the operational condition of the steam trap) derived from the frequency spectrum, and/or the current power status of the sensor unit 10.

Figure 7:
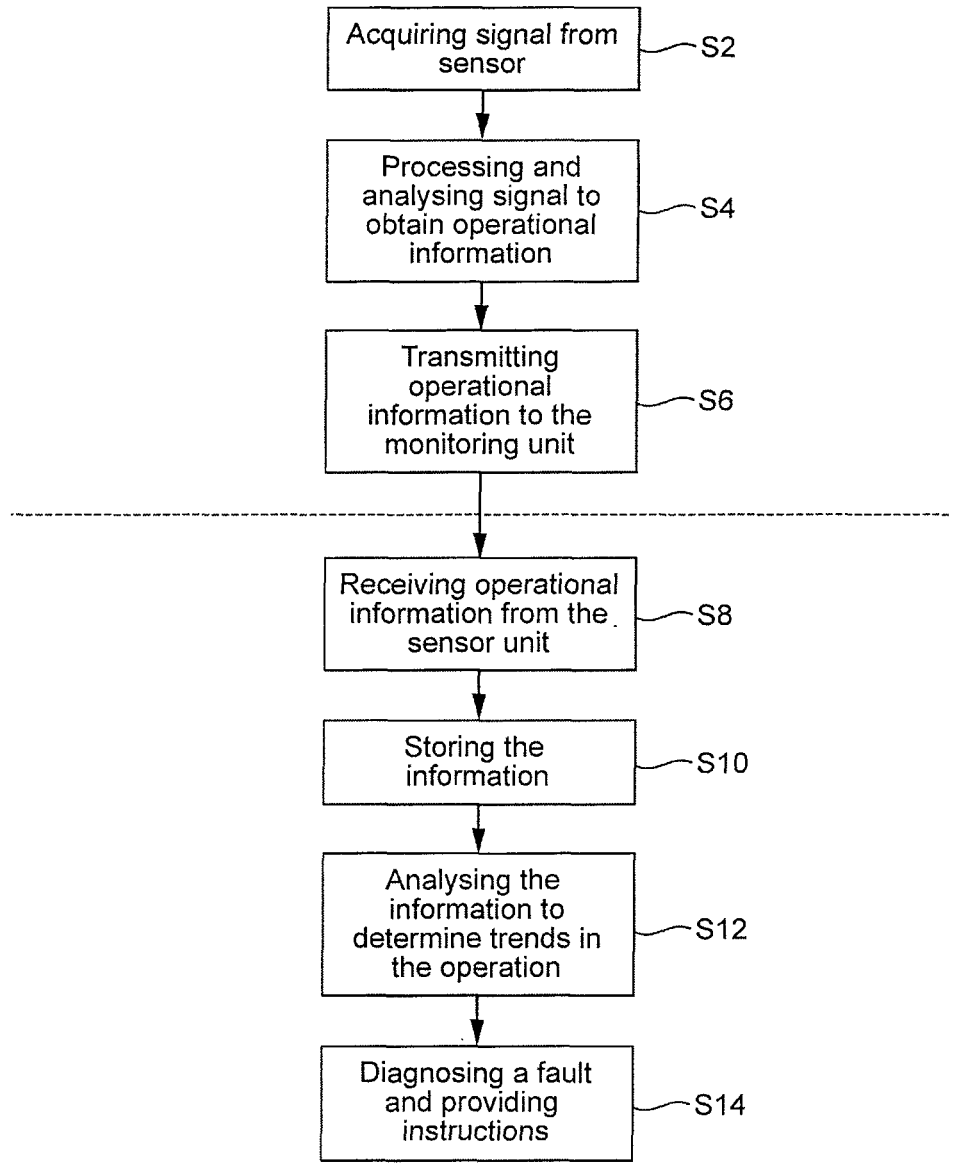
FIG. 7 is a flow diagram of the operation of the monitoring apparatus of FIG. 6.

The operation of the monitoring apparatus and its component parts will now be described with reference to the flow chart of FIG. 7. The dashed line of FIG. 7 indicates where the processes are performed, with the steps above the dashed line being performed at the sensor unit 10 and with the steps below the dashed line being performed at the monitoring unit 12. However, as discussed below certain steps may be performed by either the sensor unit 10 or the monitoring unit 12.

At Step 2 (S2), the vibro-acoustic sensor 11 produces a signal in response to the vibro-acoustic behaviour of the adjacent drain line 5a. The output of the sensor 11 is captured and recorded by the data acquisition system. As described previously, the output of the sensor 11 may be captured only when the output exceeds a predetermined threshold value (a triggering event). The captured data may be in the form shown in FIGS. 2 and 4. Such measurements are taken repeatedly (either continuously or intermittently) over a prolonged period. For example, signal samples may be taken over the course of a day, week, month, or year. If provided, the captured data may be stored in a storage unit of the sensor unit 10 for later use.

At S4, the captured raw sensor data is processed and analysed by the electronics unit 13 in order to determine the operational condition of the steam trap. The data is first conditioned, i.e. filtered and amplified, by the electronics unit 13 and then written to the memory of the electronics unit 13 in a time-based structure. For example, the data may be time-stamped so that the acquired signal is linked to the specific time of measurement. Alternatively, the data may be recorded in time order with knowledge of the period between measurements.

The data stored in the electronics unit 13 is then processed and analysed in order to obtain information regarding the operational condition of the steam trap.

The electronics unit 13 initially calculates the frequency spectrum over a predetermined period from a section of the raw data. The electronics unit 13 analyses the output signal of the sensor 11 on the basis of a pre-determined relationship between the sensor output and the live steam leakage from the adjacent steam trap 6a. The electronics unit 13 is therefore able to make a judgment on the operating condition of the condensate recovery system 1 and particularly of the steam trap 6a over the predetermined period. The electronics unit 13 repeats this analysis for the entire body of data.

At S6, the information regarding the operating condition of the steam trap 6a obtained by the electronics unit 13 is transmitted by the electronics unit 13.

The transmitted information is received by the receiver 14 of the monitoring unit 12 at S8. The received information is then written to the memory of the storage unit 16 of the monitoring unit 12 at S10 for subsequent use.

At S12, the data stored in the storage unit 16 is input to the trend analysis unit 18. The trend analysis unit 18 then performs statistical and other analysis methods, which may be executed through algorithms, to identify trends in the operating conditions of the system. For example, the trend analysis unit 18 may provide a histogram to show the amount of time a specific operating condition was experienced. Additionally, the trend analysis unit 18 may allow features of the warm-up and shutdown sequence of the process to be established.

For example, the trend analysis unit 18 may identify that the live steam leakage is high during warm-up of the steam plant which may indicate that the steam trap 6a initially failed open or closed. The trend analysis unit 18 may also identify that live steam leakage is high over a certain period of the day indicating that condensate is not present and that the steam trap is improperly sized for the application and the condensate flow rate (e.g. for an inverted bucket steam trap).

Figure 8:
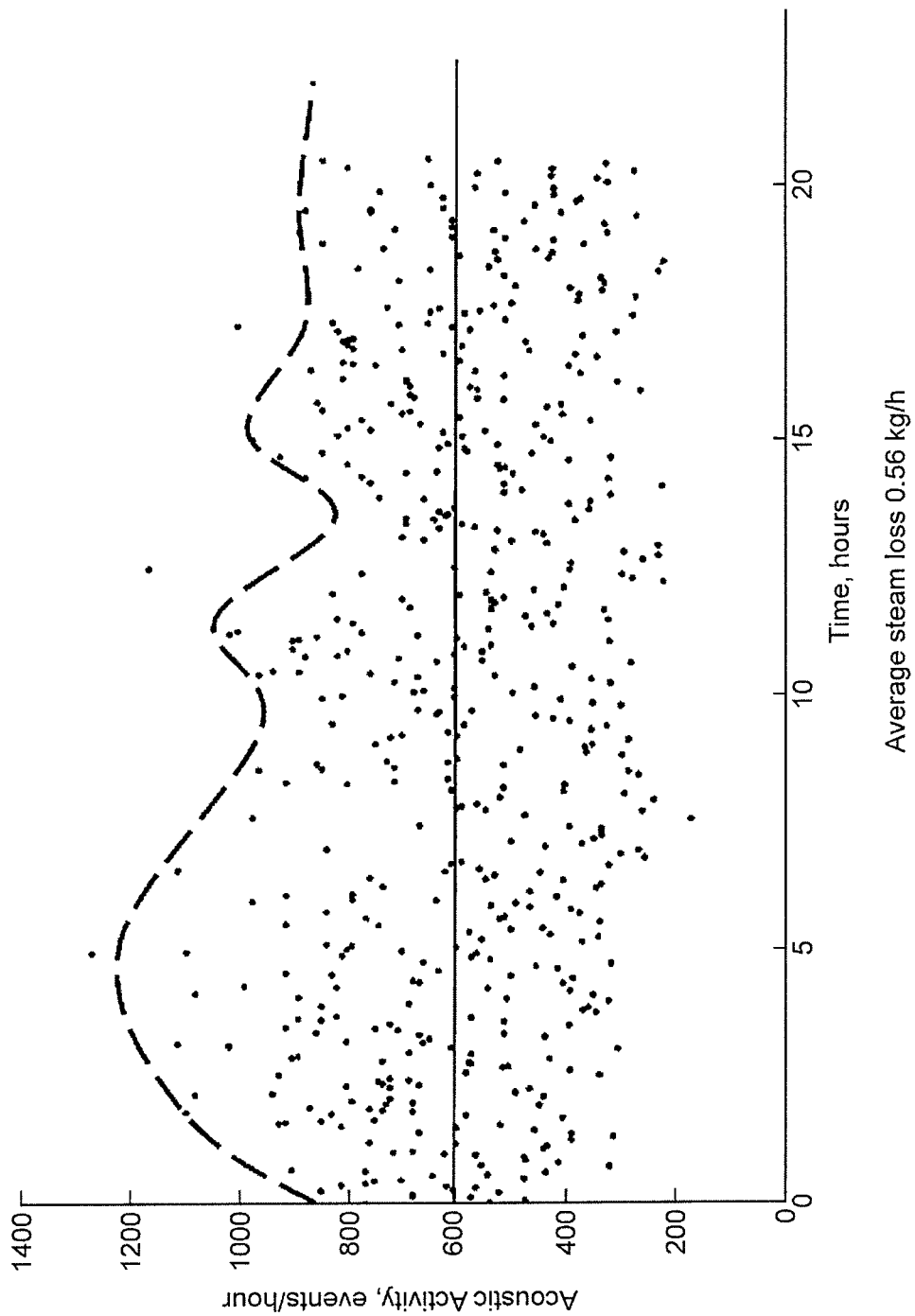
FIG. 8 is a graphical representation of an example of a trend identified by the sensor unit of FIG. 6.

FIG. 8 shows a trend in the operation of the steam trap 6a represented in terms of acquired and processed triggering events per hour associated with the vibro-acoustic behaviour of the steam trap 6a.

The trends identified by the trend analysis unit 18 are not limited to trends identified by the vibro-acoustic sensor 11. Other sensors, such as the temperature sensors, may be used to identify information about the operating condition of a steam trap or other component of the steam plant and this information can be analysed to identify trends.

Figure 9:
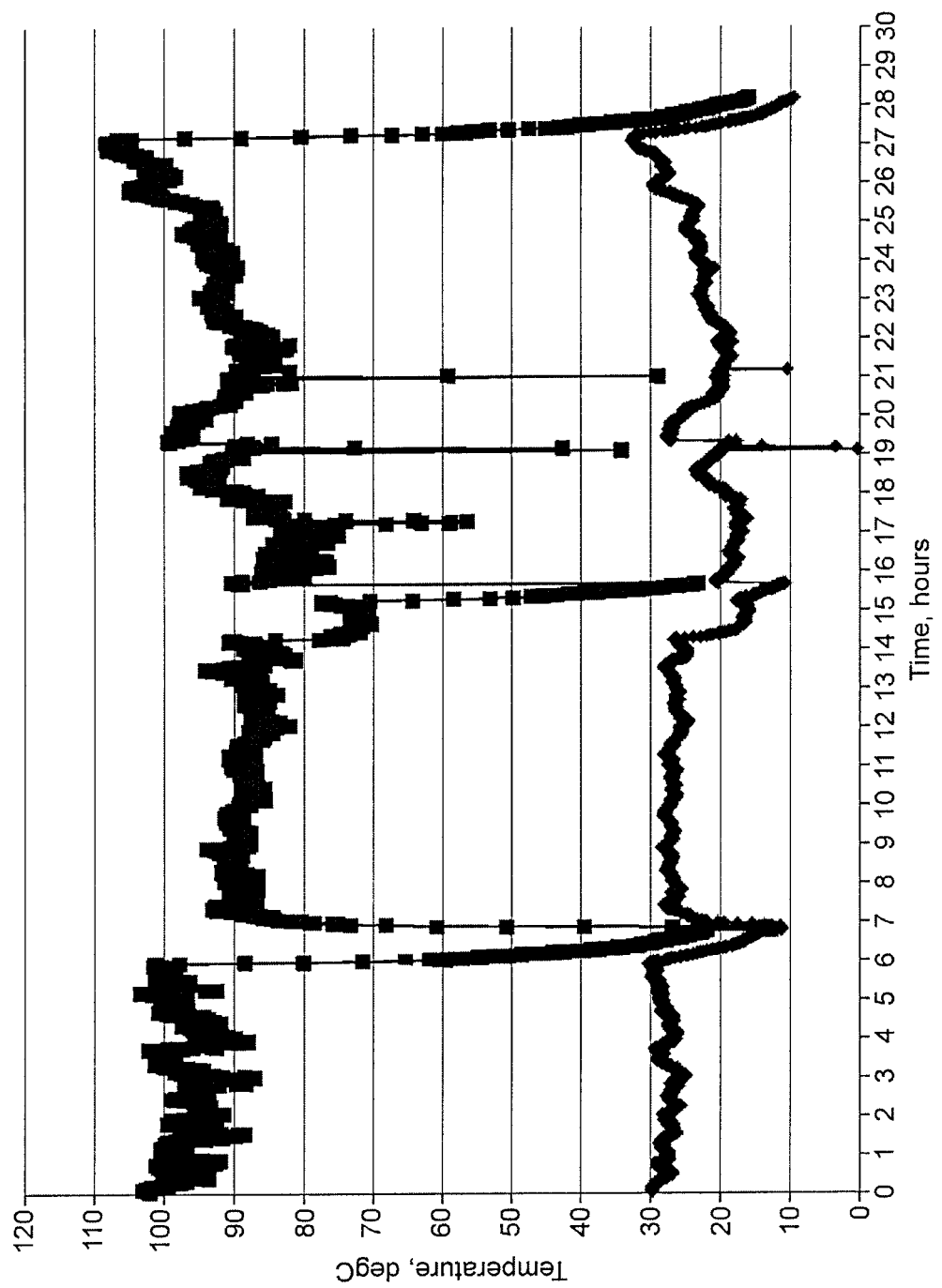
FIG. 9 is a graphical representation of an example of another trend identified by the sensor unit of FIG. 6.

FIG. 9 illustrates another trend which may be identified by the trend analysis unit 18. Here, the trend shows the temperature measurements at two different locations.

Further analysis of the trends shown in FIGS. 8 and 9 may be carried out in order to obtain additional information about the operation of the steam plant.

It will be clear that various trends and artefacts of the operation of the steam plant may be identified from the trend analysis and that the analysis is not limited to those trends shown in FIGS. 8 and 9.

The analysis of the operating conditions over a prolonged period allows more in-depth information to be obtained from the output of the vibro-acoustic sensor 11.

Clearly, if the resolution of the analysis is increased (i.e. the predetermined period for each analysis is reduced), the trend analysis unit 18 is able to more precisely identify and diagnose transient events.

The results obtained by the trend analysis unit 18 are relayed to the fault diagnosis and advisory unit 20 at S14. The fault diagnosis and advisory unit 20 further analyses the trends and artefacts identified by the trend analysis unit 18 and provides a diagnosis of a fault experienced by the condensate recovery system 1. For example, the fault diagnosis and advisory unit 20 may diagnose that the steam trap 6a is improperly sized for the steam plant. The fault diagnosis and advisory unit 20 may also provide an advisory message which indicates the type of fault, possible causes of the fault, and/or remedial action to overcome the fault. For example, the advisory message may inform an operative that the steam trap is improperly sized and therefore to replace the steam trap with a trap having a different capacity.

At least the advisory message is output to the display unit 22 so the operative can take appropriate action. Alternatively, the monitoring unit 12 may be provided with or communicate with a controller which can perform certain actions automatically in order to try to resolve the fault. The display unit 22 may also display the fault diagnosis.

The identification of trends in the operating condition of the steam plant may allow predictions to be made about the future operation of the steam plant. For example, the trend analysis may identify that the live steam leakage of a steam trap is increasing over time. Therefore, maintenance of the steam trap (for example, to replace a seal) may be scheduled for a time when it is predicted that the live steam leakage will exceed an acceptable level. Such predictions may be made based on a linear prediction or other type of prediction, or using a self-learning algorithm.

Where possible and prudent, processes may be performed at the sensor unit 10 instead of at the monitoring unit 12, or vice versa. For example, the sensor unit 10 may output the raw data from the sensor 11 and the analysis to determine the operating condition of the steam trap may be performed at the monitoring unit 12. Further, where desirable, the operation of the monitoring unit 12 may be integrated into the sensor unit 10. For example, the sensor unit 10 may comprise the trend analysis unit 18 and/or fault diagnosis and advisory unit 20.

It is envisaged that the previously described functions of the sensor unit 10 and monitoring unit 12 may be performed by one or more suitably configured and controlled CPUs (Central Processing Unit). Accordingly, several of the functions of the previously described units may in fact be provided by a single component.

Although only three steam traps are shown in FIG. 1, there may be substantially more than this. For example, the steam plant may comprise more than 10, or perhaps more than 100, steam traps. Each steam trap may be provided with a sensor unit 10. The information from each sensor unit 10 may be transmitted to a corresponding monitoring unit 12 or to a single central monitoring unit 12 which can perform the above described processes for each of the sensor units 10.

In any case, the invention is not limited to the monitoring of steam traps and may be used with other components of a steam plant. Furthermore, the invention is not limited to condensate recovery systems and may also be used in other areas of the steam plant.

Although the sensor unit 10 has been described as having a transmitter and the monitoring unit 12 a receiver 14, both the condensate sensor unit 10 and monitoring unit 12 may comprise transceivers for two-way communication.

Further, the sensor unit 10 and monitoring unit 12 may communicate via a wired connection.

Although, the invention has been described primarily as using the output of a vibro-acoustic sensor, it may alternatively use data from other types of sensor to identify trends in the operating conditions of the steam plant.

Figure 10:
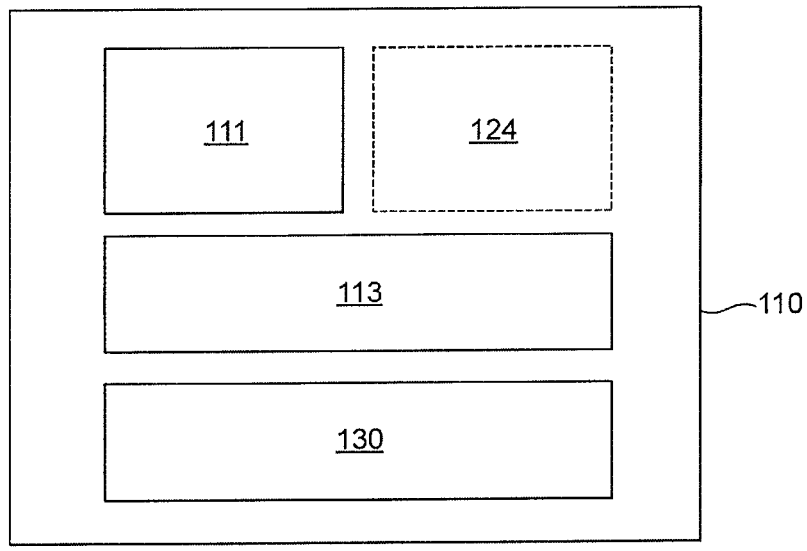
FIG. 10 is a schematic view of an embodiment of a sensor unit of a monitoring apparatus in accordance with another aspect of the invention.

Referring now to FIG. 10, an embodiment of a sensor unit 110 of a monitoring apparatus according to another aspect of the invention is schematically shown. The sensor unit 110 may be used in a steam plant having, for example, a condensate recovery system 1 as shown in FIG. 1. Further, the sensor unit 110 may be used with the monitoring unit 12 described previously.

The sensor unit 110 comprises a vibro-acoustic sensor 111, which is positioned, for example, at or near the inlet of one of the steam traps 6a, 6b, 6c (herein, steam trap 6a, as shown in FIG. 1 for sensor unit 10) to record the vibro-acoustic behaviour of the adjacent conduit.

The sensor unit 110 may also comprise an optional additional sensor 124, which will be described in more detail below.

The vibro-acoustic sensor 111 and, if provided, the additional sensor 124 are coupled to an electronics unit 113. The electronics unit 113 comprises a receiver for receiving data from the sensors. The electronics unit 113 may comprise a wireless receiver, thus allowing the vibro-acoustic sensor 111 and/or additional sensor 124 to be located remotely with respect to the electronics unit 113. The electronics unit 113 may also comprise a transmitter allowing two-way communication. The transmitter may, for example, be used to relay the output of the sensors to another device, such as the monitoring unit 12 or another sensor unit 110.

The electronics unit 113 further comprises signal processing electronics, such as a Digital Signal Processor, which are pre-programmed with algorithms to process data. The electronics unit 113 may further comprise a signal conditioner such as a filter to remove extraneous noise from the acquired signal and/or an amplifier.

The electronics unit 113 processes and analyses the signal of the vibro-acoustic sensor 111 to determine the level of live steam leakage from the associated steam trap. The sensor unit 110 may therefore determine the operational condition of the steam trap.

The electronics unit 113 calculates a frequency spectrum from the raw data received from the vibro-acoustic sensor 111, as described previously. The electronics unit 113 analyses the output of the sensor 111 on the basis of a predetermined relationship between the sensor output and the live steam leakage from the adjacent steam trap 6a. The electronics unit 113 is therefore able to make a judgment on the operating condition of the condensate recovery system 1 and particularly of the steam trap 6a.

The sensor unit 110 has a plurality of predefined operating modes. The operating modes of the sensor unit 110 are configured to have different resource requirements. For example, the operating modes may consume different amounts of power and may have different complexity due to having different requirements for storage and computational resources such as time, memory, number of steps/iterations needed to provide a valid output, etc.

The sensor unit 110 is provided with a selector 130 which selects one of the plurality of operating modes.

Figure 11:
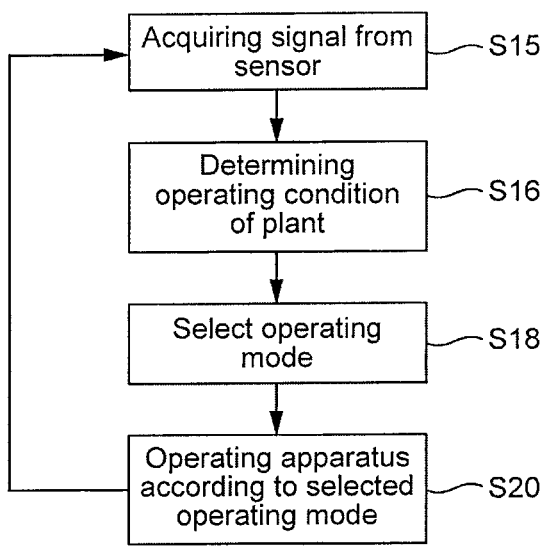
FIG. 11 is a flow diagram of the operation of the sensor unit of FIG. 10.

The function of the sensor unit 110, and particularly of the selector 130, will now be described with reference to FIG. 11.

The electronics unit 113 acquires data from the vibro-acoustic sensor 111 and/or additional sensor 124 at S15 and determines a current operating condition of the steam plant or a component thereof, such as the steam trap 6a, at S16.

The current operating condition of the steam plant can be determined from the output of the vibro-acoustic sensor 111. For example, where the signal is below a predetermined threshold, the electronics unit 113 determines that the steam plant is currently not operating. In addition, the electronics unit 113 may estimate the amount of steam loss indicated by the output of the vibro-acoustic sensor 111, as described previously.

An algorithm may also be provided which analyses the output of the vibro-acoustic sensor 111 and identifies signal characteristics associated with the plant start-up and/or shutdown sequences of the steam plant. The algorithm may be a self-learning algorithm.

Further, the additional sensor 124 may be used to provide information about the operating condition of the steam plant. For example, the additional sensor 124 may comprise a timer which is synchronised with a schedule or timetable of the steam plant. The additional sensor 124 may therefore provide an output which indicates whether the steam plant is operating at that current time.

Alternatively, or in addition, the additional sensor 124 may comprise a light sensor which measures the ambient light conditions. For example, the additional sensor 124 may measure the light conditions outside of a building in which the steam plant is housed in order to determine if it is night or day, or the additional sensor 124 may measure the light conditions inside the building to detect when the lights are turned on and off in the building.

The additional sensor 124 may also comprise a temperature and/or pressure sensor which measures a temperature/pressure at, for example, the steam traps 6a, 6b, 6c to determine whether they are in use.

Based on the current operating condition determined at S16, the selector 130 determines which of the plurality of operating modes is currently most suitable for the sensor unit 110 and automatically selects this operating mode (S18). Alternatively, an operator may select which of the operating modes is most suitable for the current operating condition.

The sensor unit 110 operates according to the selected operating mode (S20). The process of FIG. 11 is continually or periodically repeated to determine whether the selected operating mode is still suitable for the current operating condition. If the operating mode is no longer suitable, the selector 130 selects another operating mode and the sensor unit 110 operates according to this operating mode.

Each operating mode may be configured for a particular operating condition of the steam plant.

For example, where the vibro-acoustic sensor 111 indicates a high level of live steam leakage, the selected operating mode may be configured such that the electronics unit 113 performs an intensive analysis of the signal (i.e. more demanding on computational resources due to, for example, sampling at a higher rate) to confirm that there is indeed a high level of live steam leakage. At other times, an operating mode may be selected which is configured to perform a less intensive analysis of the signal (i.e. less demanding on computational resources). This may reduce the power consumption of the sensor unit 110 without sacrificing the ability to accurately determine a fault. A similar allocation of resources may be made depending on the steam usage. For example, at peak usage periods the operating mode may carry out a more intensive analysis than during low usage periods. This optimisation of power consumption may also be achieved by reducing the sampling rate or transmission rate of the vibro-acoustic sensor 111 or electronics unit 113.

Similarly, where an algorithm is used to detect the start-up sequence of the steam plant, the selected operating mode may perform an intensive analysis (i.e. more demanding on computational resources) to detect transient faults which could potentially go unnoticed with a less intensive analysis.

The plurality of operating modes may also have different settings for the communication functions of the electronics unit 113. For example, one or more of the operating modes may turn off a wireless transmitter and/or receiver of the electronics unit 113, whereas other operating modes may turn on these features. Therefore, power is only consumed by the wireless transmitter and/or receiver when the wireless function is required. For example, an operating mode in which the wireless function is turned off may be selected when it is detected that the associated steam traps 6a, 6b, 6c are not currently in use.

The sensor unit 110 may be connected in a network with other sensor units 110 using a daisy-chain topology. Accordingly, the sensor unit 110 may also turn off the wireless function where another sensor unit 110 detects a shutdown or cold signal and thus ceases communication with the sensor unit 110. This action may be mirrored in the other devices.

The operating modes of a plurality of sensor units 110 may also be controlled by one of the sensor units 110 or by a central monitoring unit (such as monitoring unit 12). For example, the sensor units 110 may be connected in a network topology comprising one or more nodes which each communicate with a plurality of sensor units 110 (i.e. the network topology branches from the nodes). Each of the nodes may act as a signal repeater. The operating modes of all of the sensor units 110 connected to a particular node may be controlled by a network command passed from one of the sensor units 110 or a central monitoring unit via the node. Alternatively, only some of the sensor units 110 may be controlled by the network command, such as a particular chain of sensor units 110 associated with the node.

Further, the nodes may also communicate to allow a command to be passed from, for example, a first node to a second node. The command may then be passed to the sensor units 110 in communication with the second node. The command may originate from one of the sensor units 110 in communication with the first node or a central monitoring unit.

The operating modes may also configure network routing characteristics, particularly in situations where the devices are connected using a mesh topology i.e. where there are multiple pathways between devices to create redundancy. For example, where it is detected that one of the devices has been shutdown, the operating mode may configure the sensor unit 110 to re-route communication via another device.

The invention provides contextual information to the sensor unit 110 so that it may operate in the most appropriate and efficient manner. This may reduce the overall power consumption of the sensor unit 110. For example, the majority of the data processing, analysis and diagnosis functions may be shutdown when it is detected that there is no live steam. Where the sensor unit 110 is battery-powered, this will reduce the frequency with which the batteries must be replaced or recharged. This may be particularly beneficial where the sensor unit 110 is located in a relatively inaccessible location.

Figure 12:
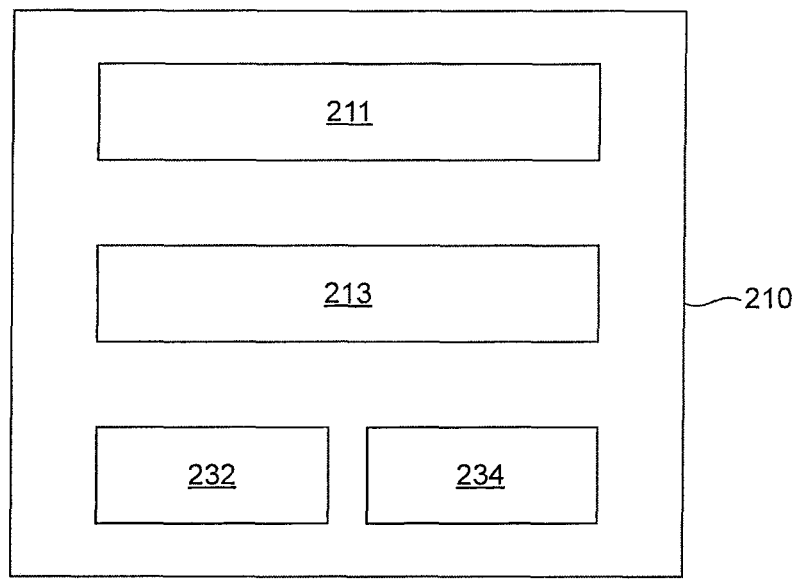
FIG. 12 is a schematic view of an embodiment of a sensor unit of a monitoring apparatus in accordance with another aspect of the invention.

Referring now to FIG. 12, an embodiment of a sensor unit 210 of a monitoring apparatus according to another aspect of the invention is schematically shown. The sensor unit 210 may be used in a steam plant having, for example, a condensate recovery system 1 as shown in FIG. 1. Further, the sensor unit 210 may be used with the monitoring unit 12 described previously.

The sensor unit 210 comprises a vibro-acoustic sensor 211, which is positioned, for example, at or near the inlet of one of the steam traps 6a, 6b, 6c (herein, steam trap 6a, as shown in FIG. 1 for sensor unit 10) to record the vibro-acoustic behaviour of the adjacent conduit.

The vibro-acoustic sensor 211 is coupled to an electronics unit 213 (functioning as a water hammer detection unit) which will be described in more detail below. The vibro-acoustic sensor 211 may be located remotely with respect to the electronics unit 213. The output of the vibro-acoustic sensor 211 may be relayed to the electronics unit 213 via any suitable communications means. For example, the vibro-acoustic sensor 211 may be coupled to the electronics unit 213 by a wired or wireless connection.

The sensor unit 210 further comprises an alerting means 232, such as a visual and/or audible alarm, and/or a controller 234. The alerting means 232 and controller 234 are connected to the electronics unit 213 and are activated by the electronics unit 213 in response to the output generated therein.

Figure 13:
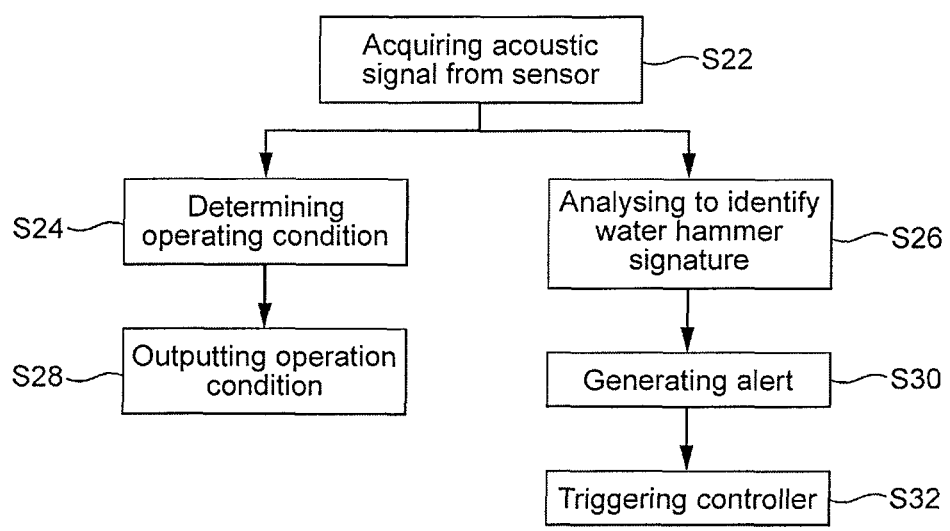
FIG. 13 is a flow diagram of the operation of the sensor unit of FIG. 12.

The function of the sensor unit 210 will now be described with reference to FIG. 13.

At S22, the electronics unit 213 acquires the signal output by the vibro-acoustic sensor 211. The electronics unit 213 calculates a frequency spectrum from the raw data received from the vibro-acoustic sensor 211, as described previously.

At S24, the electronics unit 213 analyses the output of the sensor 211 on the basis of a pre-determined relationship between the sensor output and the live steam leakage from the adjacent steam trap 6a. The electronics unit 213 is therefore able to make a judgment on the operating condition of the condensate recovery system 1 and particularly of the steam trap 6a.

The electronics unit 213 also analyses the output of the sensor 211 to identify a signature or characteristics of water hammer occurring in the steam plant (S26).

Water hammer is a temporary pressure surge created when a moving fluid is forced to stop or change direction suddenly. This pressure surge creates a banging or hammering noise inside the pipeline. The vibration can cause damage to pipelines and other components of the steam plant and is therefore undesirable.

Water hammer can occur when condensate gathers at the bottom of a pipeline. A slug of water can form if the condensate is allowed to build-up sufficiently. The slug of water is carried at steam velocity (typically 25 m/s) along the pipeline and may impact the pipeline at bends in the pipework, or may impact valves or separators in its path.

Water hammer may also take place as a result of thermal shock. This may occur where steam comes into contact with cooler condensate. This causes the steam to immediately condense which instantly reduces its volume by over a 1000 times. The reduction in volume momentarily creates a vacuum within the pipe and the condensate is accelerated into vacuum. As the void is filled, condensate impacts at the centre, sending shock waves in all directions.

The sensor signal created by a water hammer event is likely to be much larger in amplitude than any signal generated by live steam loss and/or condensate release. Consequently, the electronics unit 213 may monitor the sensor signal and determine the presence of water hammer if the signal exceeds a predetermined threshold.

As water hammer occurs unexpectedly and momentarily, it is necessary for the electronics unit 213 to continuously monitor the signal of the vibro-acoustic sensor 211 (i.e. at a sufficiently high sampling frequency to detect this transient event). Due to the increased signal processing requirements this imposes, the electronics unit 213 may initially detect water hammer from the raw data received from the sensor 211. This may be more efficient than calculating and analysing the frequency spectrum of the signal.

Alternatively, the electronics unit 213 may perform a computationally simpler or cruder Fast Fourier Transform or other analysis method to detect water hammer compared with the analysis required to determine live steam leakage.

After the electronics unit 213 identifies the presence of water hammer, it is necessary to confirm that the increased signal is indeed as a result of water hammer as opposed to any other spurious spike in the signal. The electronics unit 213 therefore captures the subsequent signal after detection of a suspected water hammer event and carries out a full analysis on the signal. For example, the electronics unit 213 calculates a frequency spectrum from the raw data received from the vibro-acoustic sensor 211, as described previously, and analyses the frequency spectrum to identify the signature or characteristics of water hammer. This process may in fact be more computationally demanding than determining the operating condition of the steam trap (for example, due to using a higher sampling rate). However, since it is only carried out when water hammer is suspected, it is performed relatively infrequently and thus minimises the computational burden.

These measures may therefore reduce the power required by the sensor unit 210.

At S28, the operating condition determined by the electronics unit 213 is output in a suitable form. For example, the operating condition, such as the level of steam leakage, may be output to a display unit to be viewed by an operative.

If the electronics unit 213 detects the presence of water hammer in the steam plant, it triggers the alerting means 232. The alerting means provides a visual and/or audible indication or alarm to inform the operative that water hammer has occurred or is developing and propagating along the plant pipework. The operative may then take appropriate action to prevent re-occurrence. For example, the operative may alter how the steam plant is controlled in the future, such as by opening and closing valves more slowly or by draining condensate more frequently. Such improved control practices may also be discovered by a self-learning algorithm. Alternatively, the operative may arrange for modifications to be made to the steam plant itself, such as adding additional steam traps to prevent the build-up of condensate or re-routing pipework.

The electronics unit 213 may also trigger the controller 234 (S32) to take remedial action in order to mitigate against the effects of water hammer and/or to prevent further occurrences of water hammer. For example, the controller may be connected to a safety valve which is opened when water hammer is detected.

Figure 14:
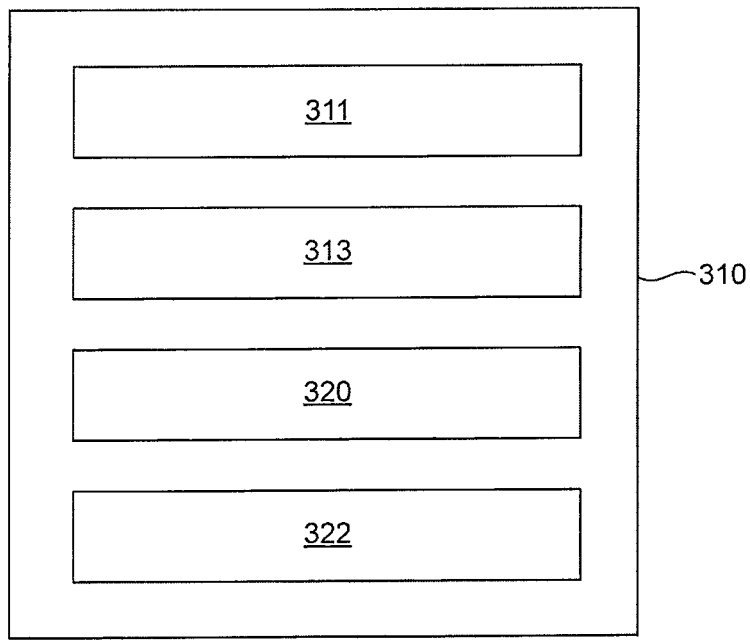
FIG. 14 is a schematic view of an embodiment of a sensor unit of a monitoring apparatus in accordance with another aspect of the invention.

Referring now to FIG. 14, an embodiment of a sensor unit 310 of a monitoring apparatus according to another aspect of the invention is schematically shown. The sensor unit 310 may be used in a steam plant having, for example, a condensate recovery system 1 as shown in FIG. 1. Further, the sensor unit 310 may be used with the monitoring unit 12 described previously.

The sensor unit 310 comprises a vibro-acoustic sensor 311, which is positioned, for example, at or near the inlet of one of the steam traps 6a, 6b, 6c (herein, steam trap 6a, as shown in FIG. 1 for sensor unit 10) to record the vibro-acoustic behaviour of the adjacent conduit.

The vibro-acoustic sensor 311 is coupled to an electronics unit 313 (functioning as a condition monitoring unit) which will be described in more detail below. The vibro-acoustic sensor 311 may be located remotely with respect to the electronics unit 313. The output of the vibro-acoustic sensor 311 may be relayed to the electronics unit 313 via any suitable communications means. For example, the vibro-acoustic sensor 311 may be coupled to the electronics unit 313 by a wired or wireless connection.

The electronics unit 313 comprises signal processing electronics, such as a Digital Signal Processor, which are pre-programmed with algorithms to process data from the vibro-acoustic sensor 311. The electronics unit 313 may further comprise a signal conditioner such as a filter to remove extraneous noise from the data and/or an amplifier.

The outputs of the algorithms performed in the electronics unit 313 are input to a fault diagnosis and advisory unit 320 which will be described in more detail below.

The sensor unit 310 further comprises a display unit 322. The display unit is ultimately used to display results, such as information or instructions, from the fault diagnosis and advisory unit 320 to a human operative. The display unit 322 may also display elements prior to the output of the fault diagnosis and advisory unit 320. For example, the display unit 322 may display the raw data from the vibro-acoustic sensor 311, the output of the electronics unit 313, etc.

Figure 15:
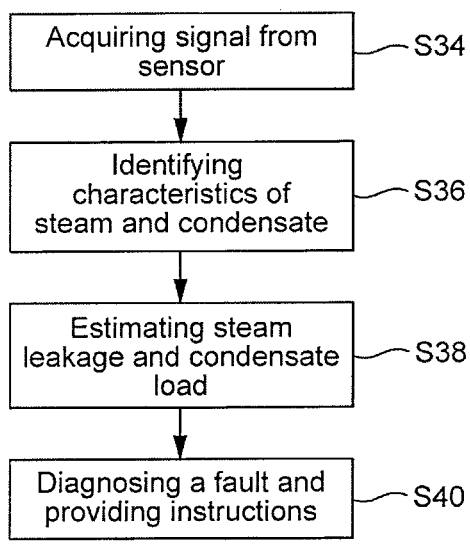
FIG. 15 is a flow diagram of the operation of the sensor unit of FIG. 14.

The operation of the sensor unit 310 and its component parts will now be described with reference to the flow chart of FIG. 15.

At S34, the vibro-acoustic sensor 311 produces a signal in response to the vibro-acoustic behaviour generated in the adjacent conduit. The output of the vibro-acoustic sensor 311 is captured and recorded by the data acquisition system.

The electronics unit 313 receives the signal from the vibro-acoustic sensor 311. The electronics unit 313 processes and analyses the signal to identify characteristics attributed to live steam and characteristics attributed to condensate (S36).

In particular, the electronics unit 313 calculates a frequency spectrum of the received sensor signal. The frequency spectrum is then divided into a plurality of frequency bands and, for each frequency band, a peak magnitude within the band is measured. The operating condition of a component of the steam plant may then be determined by calculating one or more ratios between the peak magnitudes of different frequency bands.

For example, the ratios may indicate the steam leakage from the component or the ratios may indicate the condensate load within the component. The electronics unit 313 may repeat the processing and analysis of the signal for different frequency bands in order to determine ratios indicative of both steam leakage and condensate load.

At S38, the ratios are assessed in order to estimate the current steam leakage and condensate load. The condensate load may be expressed as a relative value such as "LOW", "MEDIUM" or "HIGH" or as a more accurate estimation on the basis of a percentage of the maximum condensate load for a given plant condition.

The electronics unit 313 may also determine whether the estimated condensate load is below a predetermined lower threshold and/or whether the estimated condensate load is above a predetermined upper threshold (depending on the type of component).

The electronics unit 313 may be configured to analyse the estimated steam leakage and/or condensate load over a period to identify trends, as described with reference to the monitoring unit 12 (or this function may be provided by the monitoring unit 12).

The results obtained by the electronics unit 313 are relayed to the fault diagnosis and advisory unit 320 at S40. The fault diagnosis and advisory unit 320 analyses the estimated steam leakage and condensate load values provided by the electronics unit 313 and provides a diagnosis of a fault experienced by the steam plant.

For example, the fault diagnosis and advisory unit 320 may diagnose that a steam trap is improperly sized for the steam plant when the estimated condensate load is above a predetermined upper threshold or below a predetermined lower threshold (depending on the type of steam trap).

The fault diagnosis and advisory unit 320 may also provide an advisory message which indicates the type of fault, potential causes of the fault and/or remedial action to overcome the fault. For example, the advisory message may be to replace the steam trap with a trap having a different condensate discharge capacity.

At least the advisory message is output to the display unit 322 so an operative can take appropriate action. Alternatively, the sensor unit 310 may be provided with a controller which can perform certain actions automatically in order to try to resolve the fault. The display unit 322 may also display the fault diagnosis. In fact, the display unit 322 may display any or all processes from the initial raw data through to the final advisory message.

Figure 16:
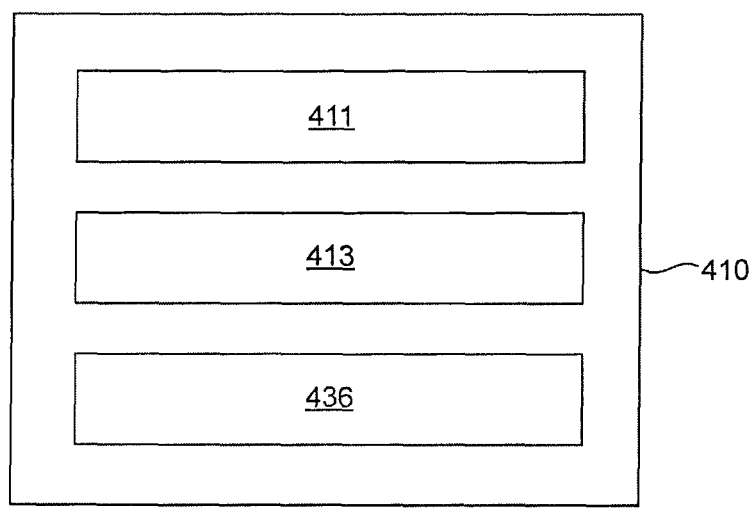
FIG. 16 is a schematic view of an embodiment of a sensor unit of a monitoring apparatus in accordance with another aspect of the invention.

Referring now to FIG. 16, an embodiment of a sensor unit 410 of a monitoring apparatus according to another aspect of the invention is schematically shown. The sensor unit 410 may be used in a steam plant having, for example, a condensate recovery system 1 as shown in FIG. 1.

Further, the sensor unit 410 may be used with the monitoring unit 12 described previously.

The sensor unit 410 comprises a remote non-contact vibro-acoustic sensor which, in this embodiment, is a laser Doppler vibrometer 411.

In general, a laser Doppler vibrometer comprises a laser source, such as helium-neon laser, which produces a laser beam. A beamsplitter is used to divide the laser beam into two coherent beams: a reference beam and a measurement beam. The measurement beam may pass through a Bragg cell which changes the frequency of the beam by a known amount. The measurement beam is then directed at a target surface where it is reflected. The reflected measurement beam combines with the reference beam creating optical interference which is detected by a suitable detector.

Vibration of the target surface creates a Doppler shift in the frequency of the measurement beam. The output of the detector is a frequency modulated signal, with the Bragg cell frequency as the carrier frequency, and the Doppler shift as the modulation frequency. This signal can be demodulated to derive the velocity as a function of time for the vibrating target surface.

The laser Doppler vibrometer 411 is directed at a conduit of the steam plant which is in fluid communication with a component to be monitored, such as a steam trap. As described previously, the acquired signal from the conduit is indicative of the steam loss and/or condensate load of the component. This vibro-acoustic behaviour of the conduit can be detected by the laser Doppler vibrometer 411.

The output of the laser Doppler vibrometer 411 is sent to an electronics unit 413 (functioning as a condition monitoring unit). As described with reference to the previous aspects of the invention, the electronics unit 413 analyses the output of the laser Doppler vibrometer 411 on the basis of a pre-determined relationship in order to make a judgment on the operating condition of the steam plant and particularly of the component to be monitored. For example, the electronics unit 413 may determine the level of live steam leakage and/or condensate load for the component.

As the laser Doppler vibrometer 411 is a non-contact sensor it may be located remotely with respect to the conduit and the component being monitored. Consequently, the laser Doppler vibrometer 411 does not need to withstand high temperatures. Further, the other components of the sensor unit 410, such as the electronics unit 413, can be co-located with the laser Doppler vibrometer 411 since they also do not need to withstand high temperatures.

The sensor unit 410 may further comprise a non-contact temperature sensor 436 for measuring the temperature of the conduit. The non-contact temperature sensor 436 may be an infrared thermometer. The non-contact temperature sensor 436 may determine when the plant is in operation in order to trigger the laser Doppler vibrometer 411.

Where the temperature sensor 436 is an infrared thermometer, it may be positioned substantially coaxially with the laser Doppler vibrometer 411. The laser source of the laser Doppler vibrometer 411 may provide a targeting beam (typically of lower power) which indicates the direction of the infrared thermometer. This ensures that the infrared thermometer is measuring the temperature of the conduit and not of the surrounding building, for example.

Although the non-contact sensor 411 has been described with reference to a laser Doppler vibrometer, other types of non-contact sensor may be used.

Particularly, the non-contact sensor may be any type of active sensor which both emits and receives radiation such as an ultrasonic Doppler vibrometer, a laser interferometer, a capacitive sensor, an inductive sensor, a fibre optic sensor, a surface acoustic wave sensor and/or an eddy current sensor.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For example, the non-contact sensor arrangement of the sensor unit 410 may be used with any of the monitoring apparatuses disclosed herein. Further, any of the various functions described with reference to the electronics units 13, 113, 213, 313, 413 may be incorporated into any other electronics unit described herein. In addition, the selector 130 of the sensor unit 110 may be used with any of the monitoring apparatuses.

The monitoring of live steam leakage and/or condensate load may allow the steam plant to operate in the most efficient manner, saving energy and thus money.

The invention claimed is:

1. A monitoring apparatus for a steam plant, the apparatus comprising:
 a sensor unit associated with a component of the steam plant, the sensor unit being configured to provide an output indicative of the operating condition of the component;
 wherein the sensor unit has a plurality of operating modes, each operating mode having a different resource usage, the sensor unit further comprises one or more additional sensors which are configured to provide an output related to the operating condition of the steam plant;
 the apparatus further comprising:
 a selector for selecting one of the plurality of operating modes; wherein the selector receives the output indicative of the operating condition of the component and the output related to the operating condition of the steam plant from the sensor unit and selects the operating mode responsive to the received outputs.

2. A monitoring apparatus as claimed in claim 1, wherein the operating condition of the steam plant is sensed by the sensor unit.

3. A monitoring apparatus as claimed in claim 1, wherein the sensor unit comprises a vibro-acoustic sensor.

4. A monitoring apparatus as claimed in claim 1, wherein the one or more additional sensors comprise temperature and/or pressure sensors.

5. A monitoring apparatus as claimed in claim 1, wherein the one or more additional sensors comprise a timer which is linked to an operating schedule of the steam plant.

6. A monitoring apparatus as claimed in claim 1, wherein the one or more additional sensors comprise a light meter which is configured to detect the ambient light conditions.

7. A monitoring apparatus as claimed in claim 1, further comprising an algorithm which is configured to recognise start-up and/or shutdown of the steam plant from the output of the sensor unit.

8. A monitoring apparatus as claimed in claim 1, wherein the selector automatically selects the operating mode.

9. A monitoring apparatus as claimed in claim 1, wherein the selector is manually controlled to select the operating mode.

10. A monitoring apparatus as claimed in claim 1, wherein the operating modes have different power usage.

11. A monitoring apparatus as claimed in claim 1, wherein the operating modes sample the output of a sensor of the sensor unit at different rates.

12. A monitoring apparatus as claimed in claim 1, wherein the operating modes process the output of a sensor of the sensor unit in different manners.

13. A monitoring apparatus as claimed in claim 1, further comprising a wireless receiver and/or transmitter, wherein the wireless receiver and/or transmitter is activated in at least one of the plurality of operating modes and deactivated in at least one other of the plurality of operating modes.

14. A monitoring apparatus as claimed in claim 1, wherein the apparatus comprises a plurality of sensor units, the selector of each of the plurality of sensor units being controlled by the sensor unit itself, another of the sensor units or by a monitoring unit.

15. A monitoring apparatus as claimed in claim 14, wherein the plurality of sensor units are connected to one or more network nodes, the selectors of some or all of the sensor units in communication with an associated network node being controlled via said network node.

* * * * *